US012590619B2

(12) United States Patent
    Boiger

(10) Patent No.: US 12,590,619 B2
(45) Date of Patent: Mar. 31, 2026

(54) DRIVE SYSTEM WITH AT LEAST ONE DRIVE UNIT, PARTICULARLY FOR HIGH SPEED APPLICATIONS AND METHOD FOR OPERATING A DRIVE SYSTEM

(71) Applicant: RENK GmbH, Augsburg (DE)

(72) Inventor: Peter Boiger, Augsburg (DE)

(73) Assignee: RENK GmbH (DE)

( * ) Notice: Subject to any disclaimer, the term of this patent is extended or adjusted under 35 U.S.C. 154(b) by 550 days.

(21) Appl. No.: 18/004,222

(22) PCT Filed: Jun. 14, 2021

(86) PCT No.: PCT/EP2021/065896
    § 371 (c)(1),
    (2) Date: Jan. 4, 2023

(87) PCT Pub. No.: WO2022/008168
    PCT Pub. Date: Jan. 13, 2022

(65) Prior Publication Data
    US 2023/0265910 A1    Aug. 24, 2023

(30) Foreign Application Priority Data
    Jul. 10, 2020    (DE) .......................... 102020118257.0

(51) Int. Cl.
    *F16H 1/22*    (2006.01)
    *H02K 7/00*    (2006.01)
    *H02K 7/116*    (2006.01)
(52) U.S. Cl.
    CPC .............. *F16H 1/22* (2013.01); *H02K 7/003* (2013.01); *H02K 7/116* (2013.01)
(58) Field of Classification Search
    CPC ........... F16H 1/22; H02K 7/003; H02K 7/116
    See application file for complete search history.

(56) References Cited

U.S. PATENT DOCUMENTS

3,168,665 A * 2/1965 Holper ................... H02K 7/125
                                                                310/83
4,752,706 A * 6/1988 Meszaros ............... H02K 21/12
                                                                310/82
(Continued)

FOREIGN PATENT DOCUMENTS

DE        1 953 146 A1    4/1971
DE        44 02 337 A1    8/1995
(Continued)

OTHER PUBLICATIONS

European Patent Office; Search Report in related International Patent Application No. PCT/EP2021/065896 dated Sep. 16, 2021; 3 pages.

(Continued)

*Primary Examiner* — Terrance L Kenerly
(74) *Attorney, Agent, or Firm* — Dorton & Willis, LLP

(57)        ABSTRACT

A drive system has at least one drive unit each drive unit including a central shaft and a central gear connected to the central shaft such that the central gear rotates at a speed of the central shaft. Two to four decentralized gears are distributed around the circumference of the central gear and mesh with the central gear such that the rotational speed of the central gear is at least 0.5 times the rotational speed of the decentralized gears. A plurality of electric machines are operable at a speed of at least 4,000 rpm, and each decentralized gear wheel is coupled directly and without transmission ratio to a single electric machine or to two electric machines, respectively.

14 Claims, 5 Drawing Sheets

(56)    References Cited

U.S. PATENT DOCUMENTS

| | | | |
|---|---|---|---|
| 9,991,763 B1 | 6/2018 | Downs et al. | |
| 2005/0140230 A1* | 6/2005 | Johnson ................. | H02K 29/10 |
| | | | 903/917 |
| 2020/0235637 A1* | 7/2020 | Galmiche ............. | H02K 7/116 |

FOREIGN PATENT DOCUMENTS

| | | |
|---|---|---|
| DE | 102013003748 A1 | 9/2014 |
| DE | 102017000304 B3 | 5/2018 |
| DE | 102017010372 A1 | 6/2018 |
| DE | 10 2018 128 367 A1 | 5/2019 |
| EP | 1 319 866 A1 | 6/2003 |
| FR | 2215116 A5 | 8/1974 |
| JP | H07243485 A | 9/1995 |
| JP | 2011256797 A | 12/2011 |
| JP | 3222252 U | 7/2019 |
| WO | 2018176293 A1 | 10/2018 |

OTHER PUBLICATIONS

Gernman Patent Office; Examination Report in related German Patent Application No. 10 2020 118 257.0 dated Dec. 9, 2020; 6 pages.

Japanese Patent Office; Examination Report in related Indian Patent Application No. 2023-500062 dated Feb. 14, 2024; 6 pages.

Korean Patent Office; Office Action in related Korean Patent Application No. 10-2023-7003255 dated Jul. 26, 2024; 6 pages.

Korean Patent Office; Final Rejection in related Korean Patent Application No. 10-2023-7003255 dated Apr. 9, 2025; 6 pages.

Chinese Patent Office; Office Action in related Chinese Patent Application No. 202180049188.7 dated Nov. 19, 2025; 8 pages.

Indian Patent Office; Examination Report in related Indian Patent Application No. 202347007334 dated Feb. 15, 2023; 5 pages.

* cited by examiner

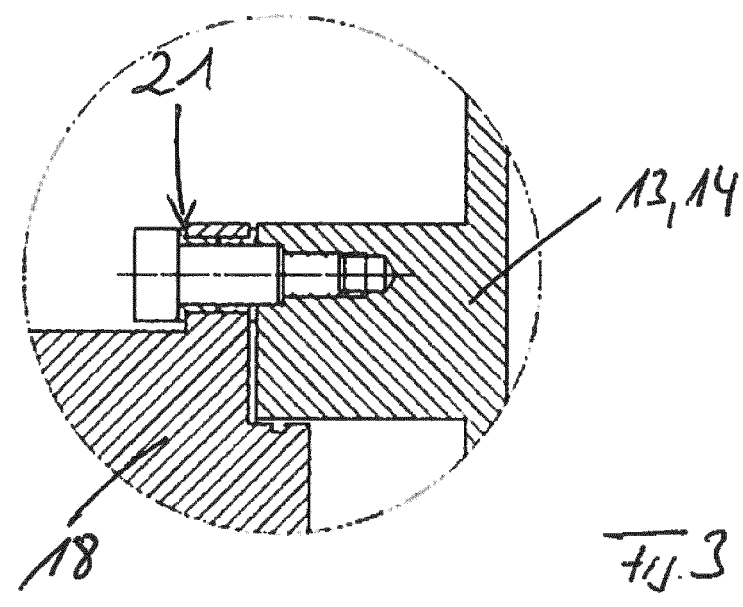
_Fig. 3_
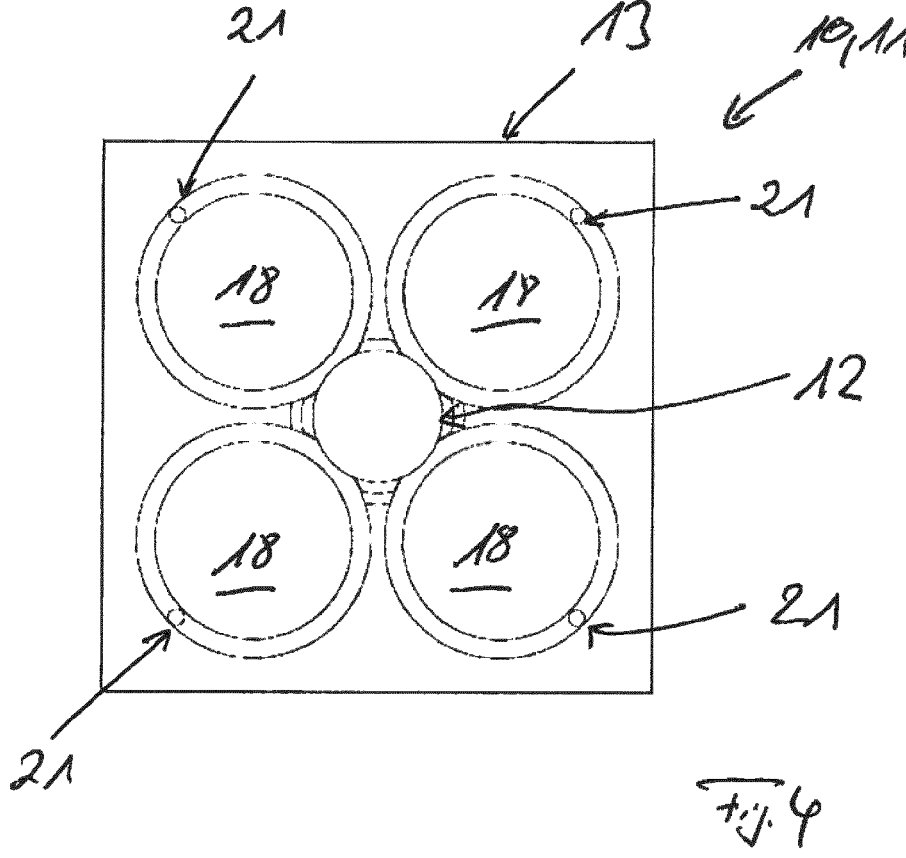
_Fig. 4_

DRIVE SYSTEM WITH AT LEAST ONE DRIVE UNIT, PARTICULARLY FOR HIGH SPEED APPLICATIONS AND METHOD FOR OPERATING A DRIVE SYSTEM

CROSS-REFERENCE TO RELATED APPLICATIONS

This application is a national phase application under 35 U.S.C. § 371 of International Patent Application No. PCT/ EP2021/065896, filed Jun. 14, 2021 (pending), which claims the benefit of priority to German Patent Application No. DE 102020118257.0, filed Jul. 10, 2020, and is related to U.S. patent application Ser. No. 18/004,223, filed Jan. 4, 2023, the disclosures of which are incorporated by reference herein in their entirety.

TECHNICAL FIELD

The invention relates to a drive system particularly for high-speed applications. Furthermore, the invention relates to a method for operating such a drive system.

BACKGROUND

Drive systems known from practice, which interact in particular with fluid machinery such as turbines and compressors, and which transmit drive powers of more than 1 MW, in particular drive powers between 1 MW and 10 MW, require a lot of installation space, are heavy and expensive. This applies both to drive systems that transmit power provided by a turbine in the direction of a generator and to drive systems that transmit drive power starting from an electric machine in the direction of a compressor or in the direction of a centrifugal pump. There is therefore a need for a drive system that requires relatively little installation space, is relatively lightweight and is cost-effective, even when transmitting drive powers of more than 1 MW.

SUMMARY

Based on this, it is on object of the present invention to provide a novel drive system and a method for operating such a drive system.

This task is solved by a drive system as described herein.

The drive system comprises at least one drive unit.

The at least one drive unit of the drive system each comprise the following: A central shaft. A central gear wheel connected to the central shaft in such a way that the central gear wheel rotates at the speed of the central shaft. At least two and at most four, namely two or three or four, decentralized gearwheels distributed over the circumference of the central gearwheel and meshing with the central gearwheel in such a way that the rotational speed of the central gearwheel is at least 0.5 times the rotational speed of the decentralized gearwheels. A plurality, namely at least two and at most eight, electric machines which are operable at a speed of at least 4,000 rpm, wherein each decentralized gearwheel is coupled in each case to a single electric machine or to two electric machines directly and without transmission.

For each drive unit, the drive system comprises the central shaft, the central gear wheel rotating with the central shaft, the decentralized gear wheels, and the electric machines, which are coupled directly and without transmission to the decentralized gear wheels.

The decentralized gears of the respective drive unit are in mesh with the central gear of the respective drive unit in such a way that the speed of the central gear is at least 0.5 times the speed of the decentralized gears, which rotate at the same speed as the electric machines of the respective drive unit. The electric machines of the respective drive unit rotate at a speed of at least 4,000 rpm, from which it follows that the speed of the central shaft is at least 2,000 rpm. A drive system or drive unit whose central shaft rotates at a speed of at least 2,000 rpm is a drive system or drive unit for high-speed applications. The drive system according to the invention can make use of commercially available and inexpensive electrical machines and can therefore be implemented at relatively low cost. Furthermore, such a drive system is relatively lightweight and requires little installation space.

The advantages that can be achieved are due in particular to the fact that conventional drive solutions use much slower-running electric machines that require much higher torques for the same power. If faster-running electric machines are used which rotate at a speed of at least 4,000 rpm as proposed in the invention, significantly smaller components are produced.

Since the speed of turbines or compressors is high anyway, transmission gears are also becoming smaller and lighter because they operate with the low torques of fast-running electric machines.

High-speed electric machines are known in special design and can be coupled gearlessly with turbines or compressors. However, such electric machines pose considerable rotordynamic challenges, require complex bearing technology and are extremely costly.

On the one hand, modularization of the drive system into drive units and, on the other hand, modularization of the drive units into the multiple electric machines and decentralized gears is proposed. In this way, it is possible to use relatively compact, lightweight and low-cost standard components when constructing a drive system that provides a drive power of at least 1 MW. Instead of a special design, common standard parts of small partial outputs are combined to a total output corresponding to the drive task.

The at least one drive unit further comprises associated bearings for the central shaft and the decentralized shafts. Furthermore, the at least one drive unit comprises a, in particular oil-carrying, housing.

If the drive system has several drive units, all drive units are identical to each other. Within a drive unit, the decentralized gears, bearings and, in particular, the electrical machines are identical.

According to a further embodiment of the invention, the decentralized gearwheels of the respective drive unit are in mesh with the central gearwheel of the respective drive unit in such a way that the rotational speed of the central gearwheel is between 0.5 times and 4.0 times, preferably between 0.8 times and 3.0 times, particularly preferably more than 1.0 times and at most 2.5 times, the rotational speed of the decentralized gearwheels.

It should be noted that combinations of these above subranges are also included, in such a way that the speed of rotation of the central gear wheel of the respective drive unit is in particular between 0.5 times and 3.0 times, between 0.5 times and 2.5 times, between 0.8 times and 4.0 times, between 0.8 times and 2.5 times, more than 1.0 times and at most 4.0 times, more than 1.0 times and at most 3.0 times, between 2.5 times and 4.0 times or also between 3.0 times and 4.0 times the rotational speed of the decentralized gear wheels of the respective drive unit.

Then, when the central gearwheel of the respective drive unit rotates faster than the decentralized gearwheels and thus the electric machines of the respective drive unit, the drive system or the respective drive unit, in which the electric machines as electric motors transmit drive power in the direction of, for example, a compressor, provides a transmission into the faster direction. For this application in particular, a drive system for driving a compressor can be provided at particularly low cost, with particularly low weight and particularly small installation space, with several, in particular identical, electric machines.

According to a further embodiment of the invention, the drive system comprises a plurality of drive units connected in series, wherein the central shafts of the drive units are coupled. If more drive power is to be transmitted than can be transmitted by a single drive unit, the drive system comprises several drive units connected in series. This modularity of the drive system as well as the modularity of the drive units can save installation space, costs and weight compared to conventional drive systems.

Preferably, the electric machines of the respective drive unit are drive motors which drive the decentralized gears, wherein the central shaft of the respective drive unit is an output shaft to which a unit to be driven can be coupled, preferably a compressor or a centrifugal pump.

Alternatively, the electric machines of the respective drive unit are generators which can be driven via the decentralized gear wheels, the central shaft of the respective drive unit being a drive shaft to which a drive unit can be coupled, preferably a turbine.

Particularly preferably, the invention is used when the electric machines serve as drive units to drive a drive unit coupled to the central shaft, for example a compressor or a centrifugal pump. In this case, a transmission between the decentralized gearwheels and the central gearwheel is designed in such a way that, starting from the electric machines, a transmission into the faster then takes place, so that the central gearwheel of the respective drive unit rotates at a higher speed than the electric machines of the respective drive unit. Thus, in the case of electric machines that are operated at a speed of at least 4,000 rpm, a speed of, for example, 16,000 rpm can be provided at the central shaft and thus at the unit to be driven.

The electrical machines of the respective drive unit are preferably synchronous machines with a frequency converter.

An exemplary method of operating a drive system is also described. By adjusting the frequency of the frequency converters, output speeds of the electrical machines may easily be varied within a range of 4,000 to 9,000 rpm at rated conditions. Since different output speeds of the electrical machines are available, a drive system that is the same can be used for a wide range of applications with an identical drive system design. Since project-specific adaptations generate costs that are incurred again with each subsequent project, this creates further potential for savings.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 3 is a detail view of the drive unit of FIGS. 1, 2 in the area of the of one of the electrical machines;

FIG. 4 is an end view of the drive unit of FIG. 1 and;

DETAILED DESCRIPTION

Figure 1:
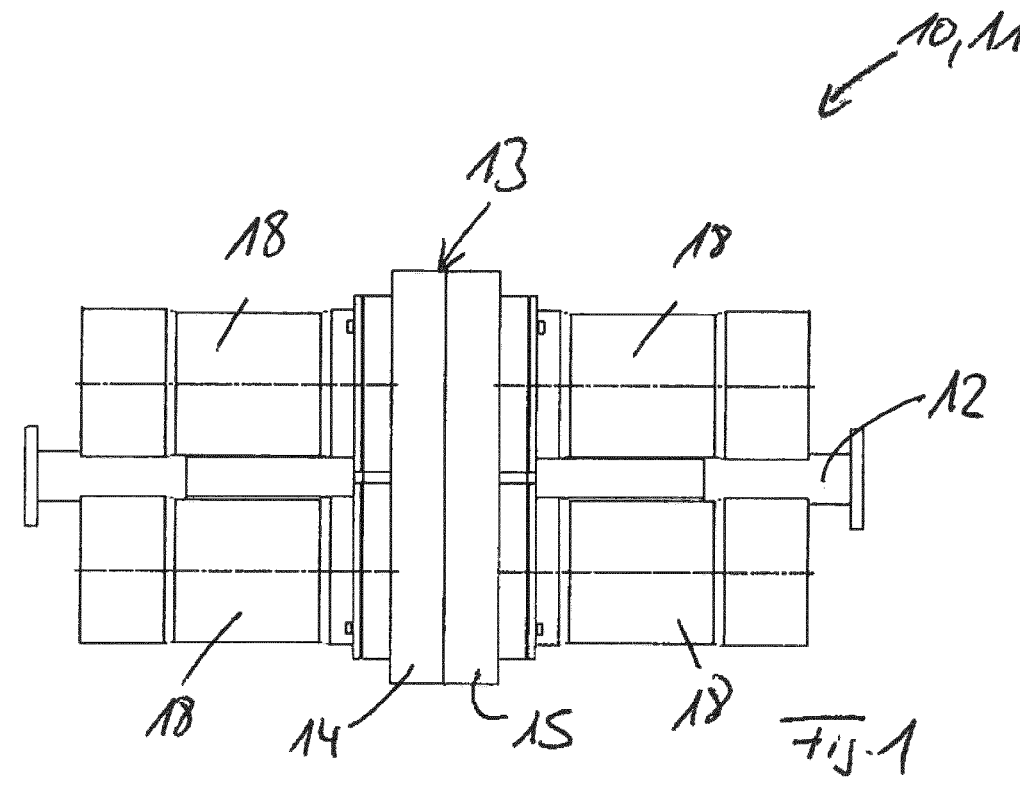
FIG. 1 depicts a side view of a drive unit of a drive system in accordance with the present disclosure.
Figure 2:
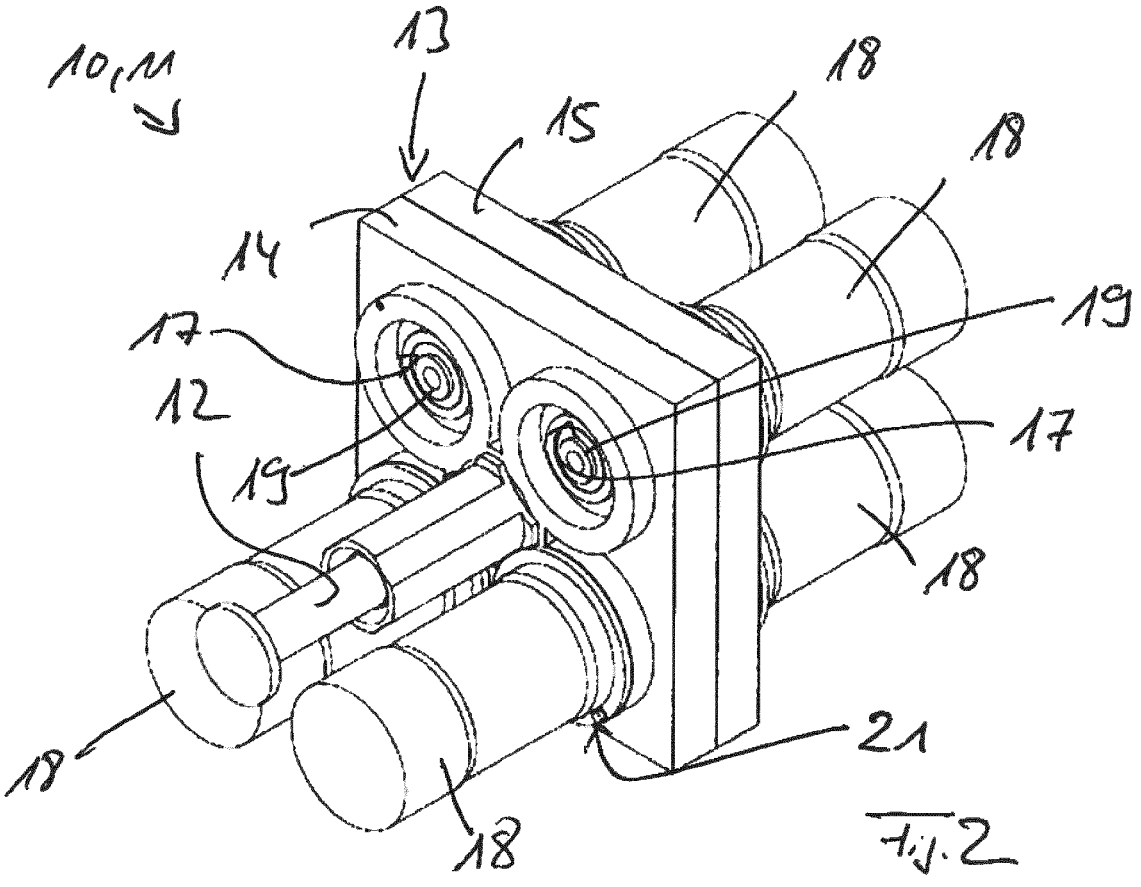
FIG. 2 depicts a perspective view of the drive unit FIG. 1 with partially disassembled electrical machines.

The invention relates to a drive system with at least one drive unit. The drive system may comprise several identical drive units.

The drive system according to the invention is preferably used in conjunction with turbomachinery, either to transmit motor drive power from electric machines designed as drive motors in the direction of a compressor, or to transmit mechanical drive power from a turbine in the direction of electric machines designed as generators.

The drive power to be transmitted is more than 1 MW, preferably between 1 MW and 10 MW, preferably between 2.5 MW and 10 MW.

FIGS. 1 to 4 show schematized different views and details of a drive system 10 with a drive unit 11.

The drive unit 11 has a central shaft 12. The central shaft 12 is rotatably mounted in a housing 13 of the drive unit 11. According to FIGS. 1, 2, the housing 13 is divided into two housing halves 14, 15.

The drive unit 11 further includes a central gear 16 (see FIG. 5), which is connected to the central shaft 12 and rotates together with the central shaft 12. The central gear wheel 16 is connected to the central shaft 12 directly and without transmission.

The drive unit 11 further has at least two and at most four, i.e. two, three or four, decentralized gear wheels 17, which are preferably uniformly distributed over the circumference of the central gear wheel 16 and mesh with the central gear wheel 16 in such a way that the rotational speed of the central gear wheel 16 is at least 0.5 times the rotational speed of the decentralized gear wheels 17. Four decentralized gear wheels 17 uniformly distributed over the circumference of the central gear wheel 16 are preferred.

Preferably, the decentralized gears 17 mesh with the central gear 16 in such a way that the speed of the central gear 16 is at least 0.8 times, and more preferably more than 1.0 times, the speed of the decentralized gears 17.

Preferably, it is provided that the decentralized gear wheels 17 of the drive unit 11 mesh with the central gear wheel 16 of the drive unit 11 in such a way that the rotational speed of the central gear wheel 16 is between 0.5 and 4.0 times, preferably between 0.8 and 3.0 times, particularly preferably more than 1.0 times and at most 2.5 times, the rotational speed of the decentralized gear wheels 17.

It should be noted that combinations of these above subranges are also included, in such a way that the speed of rotation of the central gear wheel 16 of the respective drive unit 11 is in particular between 0.5-fold and 3.0-fold, between 0.5-fold and 2.5-fold, between 0.8-fold and 4.0-fold, between 0.8 times and 2.5 times, more than 1.0 times and at most 4.0 times, more than 1.0 times and at most 3.0 times, between 2.5 times and 4.0 times or also between 3.0 times and 4.0 times the rotational speed of the decentralized gear wheels 17 of the respective drive unit 11.

The decentralized gear wheels 17 of the drive unit 11 mesh directly or immediately with the central gear wheel 16.

The decentralized gear wheels 17 of the drive unit 11 therefore mesh with the central gear wheel 16 of the drive unit 11 without the interposition of further gear wheels.

The drive unit 11 further has several, namely at least two and at most eight, electric machines 18. Each decentralized gear wheel 17 is coupled directly and without transmission to a single electric machine 18 or, as shown in the embodiment example of FIGS. 1 to 4, to two electric machines 18. The speed of the electric machines 18 corresponds to the speed of the decentralized gearwheels 17.

Figure 5:
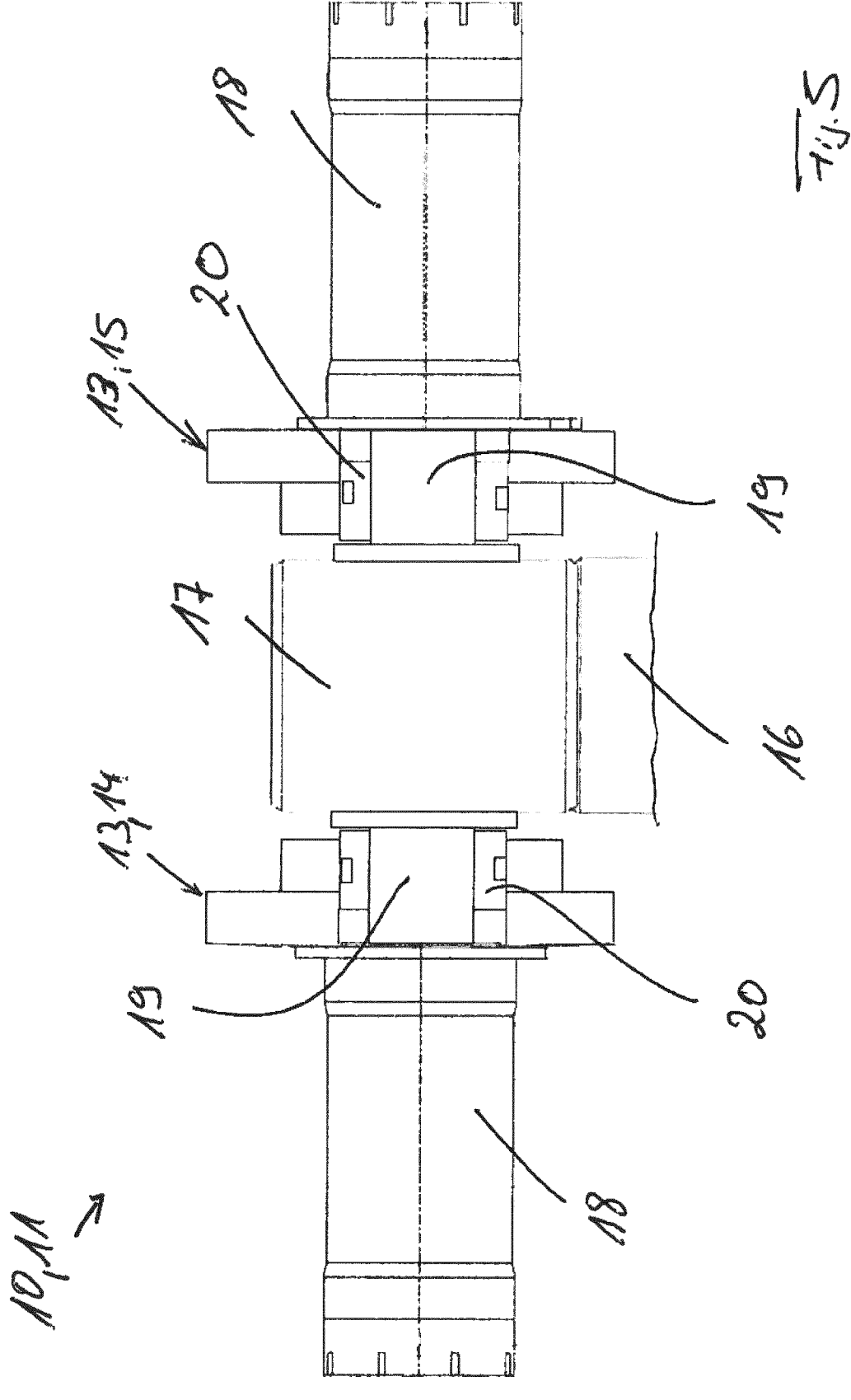
FIG. 5 is a detail view of the drive unit of FIGS. 1, 2 in the area of a decentralized gear wheel and two electric machines.

FIG. 5 shows a detail of the drive unit 11 in the area of a decentralized gear wheel 17, which is coupled directly and without transmission to two electric machines 18. The decentralized gear wheel 17, which is shown in FIG. 5, is connected to a shaft 19, which is coupled at both ends directly and without transmission to a respective electric machine 18. This shaft 19 is rotatably mounted in the housing 13, namely via bearings 20.

The electric machines 18 of the drive unit 11 rotate at a speed of at least 4,000 rpm. The rotational speed of the central shaft 12 of the respective drive unit 11 is at least 2,000 rpm. A drive system 10 or drive unit 11 whose central shaft 12 rotates at a speed of at least 2,000 rpm is a drive system 10 or drive unit 11 for high-speed applications.

Then, if the electric machines 18 have a speed of 4,000 rpm and a gear ratio between the decentralized gears 17 and the central gear 16 is 4.0, the speed of the central shaft 12 is then 16,000 rpm. With a gear ratio of 4.0, the speed of the central gear wheel 16 and thus of the central 12 shaft corresponds to 4.0 times the speed of the decentralized gear wheels 17 and thus of the electric machines 18. With higher speeds of the electric machines 18, higher speeds can of course be realized at the central shaft 16.

Preferably, a shaft of a respective electric machine 18 of the respective drive unit 11 is directly coupled to the respective decentralized gear 17, namely to the shaft 19 carrying the respective decentralized gear 17, wherein the respective electric machine is fixed to the housing 13 of the respective drive unit 11.

Each drive unit 11 preferably has two central bearings for the central shaft 12, which comprise at least radial bearings and optionally a thrust bearing.

As already explained, each shaft 19 connected to a decentralized gear 17 is rotatably supported in the housing 13 via the bearings 20. The bearings 20 include at least radial bearings and possibly also thrust bearings.

The electric machines 18 are preferably coupled to this shaft 19 via plug-in gears.

According to FIG. 3, the electric machines 18 are connected to the housing 13 of the drive unit 11 via bushings 21. The electric machines 18 can be easily mounted and dismounted, namely in horizontal direction.

The electric machines 18 can provide or take in power of, in particular, up to 500 kW. Preferably, the power of each of the electric machines 18 is between 100 kW and 500 kW, in particular between 100 kW and 350 kW or between 350 kW and 500 kW. The electric machines 18 may also have outputs of more than 500 kW.

For example, if the power of an electric machine is 300 kW, the total power of the drive unit 11 shown in FIGS. 1 to 4, which has eight identical electric machines 18, is 2.4 MW.

If more power is required, a drive system 10 comprising multiple drive units 11 connected in series can be provided. If each drive unit has 2.4 MW, four drive units connected in series can provide 9.6 MW of power.

Figure 6:
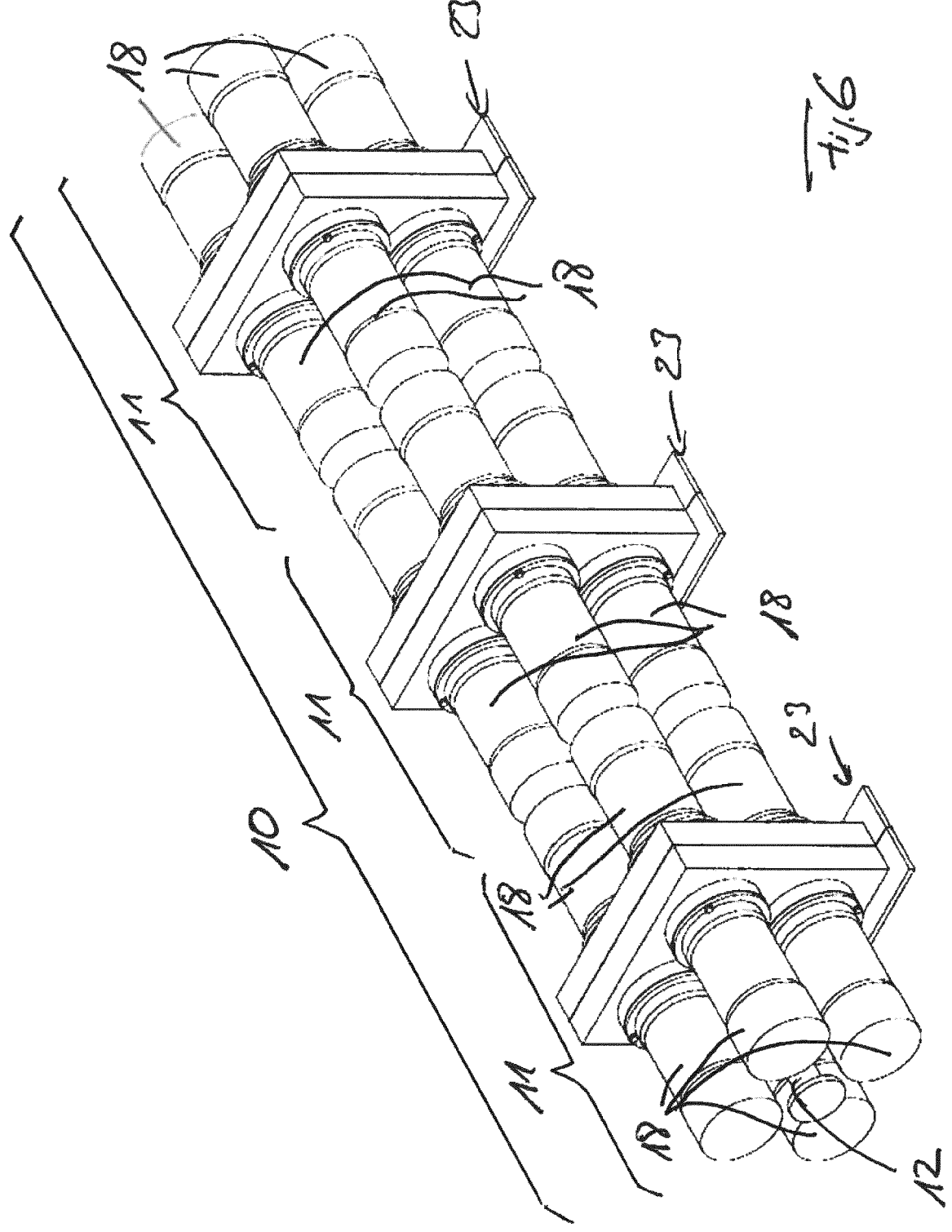
FIG. 6 depicts a perspective view of an exemplary drive system with three drive units coupled in series.
Figure 7:
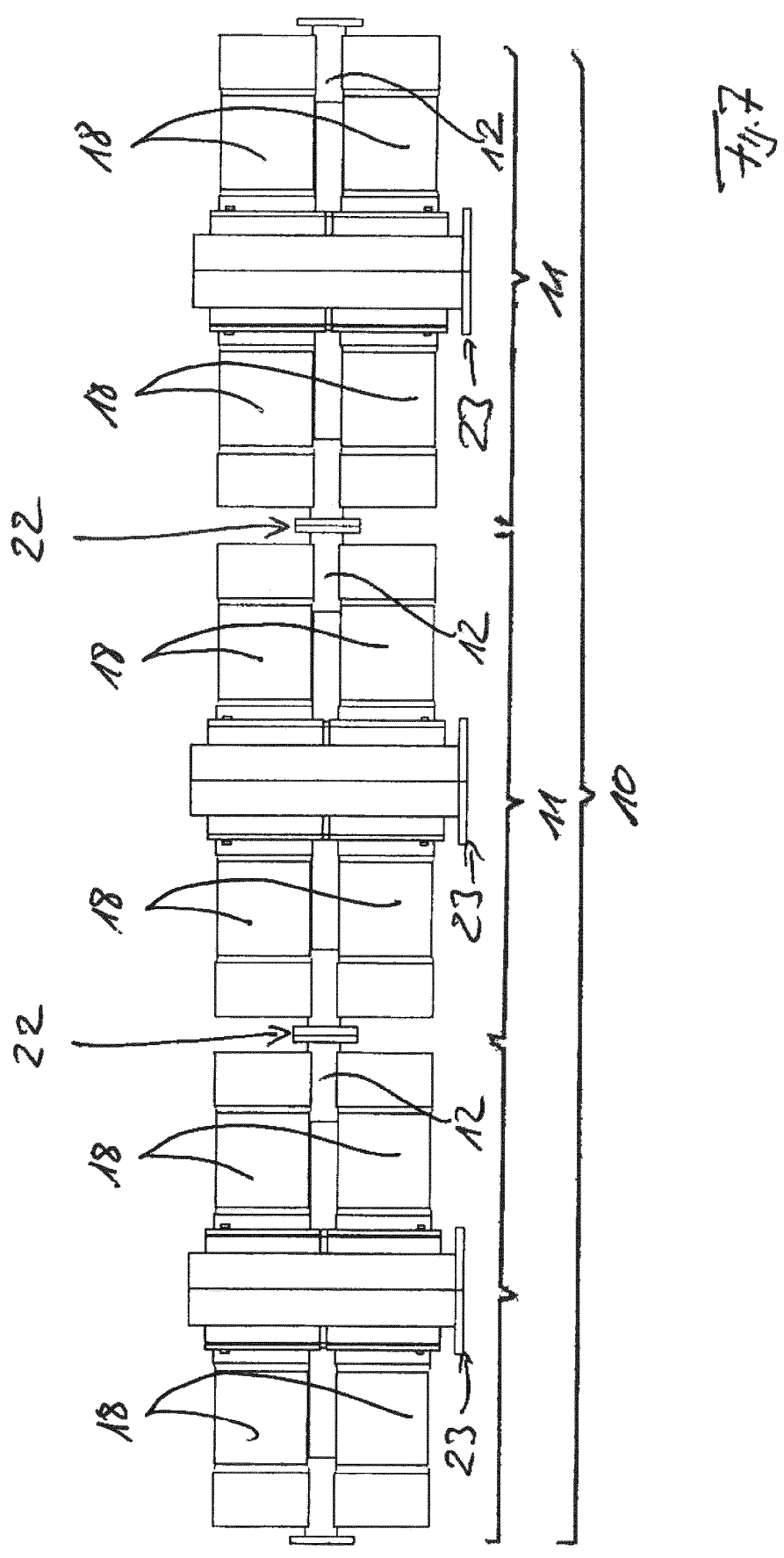
FIG. 7 is a side view of the drive system of FIG. 6.

FIGS. 6 and 7 show a drive system 10 with three drive units 11 connected in series. According to FIG. 7, the central shafts 12 of the connected drive units 11 are coupled to each other via clutch 22.

The clutch 22 may be switchable clutch 22 or fixed, non-switchable clutch 22. The clutch 22 may be surrounded by a clutch shuttering with oil drain holes.

In FIGS. 6 and 7, a mounting block 23 and a lubricating oil supply and/or cooling oil supply are arranged under each housing 13 of the respective drive unit 11. The central bearings of the respective drive unit 11 are supported via the respective mounting block 23.

As already explained, the housing 13 of the respective drive unit 11 is divided, preferably vertically. Horizontal separation is also possible.

The decentralized gears 17 are preferably uniformly distributed around the circumference of the central gear 16. A straight line through the axes of rotation or centers of two decentralized gears 17 diametrically opposite each other on the central gear 16 intersects the axis of rotation or center of the central gear 16. The axes of rotation of the decentralized gears 17 or the electric machines 18 run orthogonally to a parting line of the housing 13. In the case of four decentralized gears 17, the axes of rotation or centers thereof are arranged in two parallel planes. In each of these two planes, the rotational axes or centers of two decentralized gears 17 are positioned. This symmetry is particularly preferred and bearing loads are kept as low as possible.

In a first variant of the invention, it is provided that the electric machines 18 of the drive unit 11 are drive motors which drive the decentralized gear wheels 17 without transmission. In this case, the decentralized gear wheels 17 then drive the central gear wheel 16 and the central shaft 12, whereby a unit to be driven is then coupled to the central shaft 12, preferably a compressor or a centrifugal pump.

In a second variant of the invention, it is provided that the electric machines 18 of the respective drive unit 11 are generators which are driven via the decentralized gear wheels 17. In this case, a drive unit is then coupled to the central shaft 12, which drives the central shaft 12, via the central shaft 12 the central gearwheel 16, via the central gearwheel 16 the decentralized gearwheels 17 in engagement with the central gearwheel 16 and thus ultimately the electric machines 18 serving as generators. A turbine is then preferably coupled to the central shaft 12 as the drive unit.

The drive system 10 is characterized by a high degree of modularity. Depending on the required power, the drive system 10 comprises one or more drive units 11. In the case of several drive units 11, these are of identical design to one another. Each drive unit 11 has the central shaft 12, the central gear wheel 16 and between two and four decentralized gear wheels 17, which are in mesh with the central gear wheel 16 and are coupled directly and without transmission in each case to one or two electric machines 18. The electric machines 18 of a drive unit 11 are preferably identical. The decentralized gears 17 are identical and preferably uniformly distributed around the circumference of the central gear 16. With access to simple, standardized components, a low-cost, lightweight drive system requiring little installation space can thus be provided with high performance of the drive system 10. The torque at the central shaft 12 is at most as large as the sum of the torques provided by the individual electric machines 18 divided by the transmission ratio between the decentralized gears 17 and the central gear 16.

The electric machines 18 of the respective drive unit 11 are preferably designed as synchronous machines with frequency converters. By adjusting the frequency of the frequency converters, output speeds of the electric machines 18 can be easily varied in a range from 4,000 to 9,000 rpm under nominal conditions. In addition, the start-up of the respective drive unit 11 with the coupled power unit is much simpler with the aid of a frequency converter and does not impose an extraordinary load on a power system. Since different output speeds of the electrical machines 18 are available through the frequency converter, a drive system that is always the same can be used for a wide range of applications with an identical design of the drive system. Since project-specific adaptations generate costs that are incurred again with each subsequent project, this creates further potential for savings. Preferably, the electrical machines 18 are operated in a so-called corner point thereof. Operation of the electrical machines 18 below and above the corner point is also possible.

While the present invention has been illustrated by a description of various embodiments, and while these embodiments have been described in considerable detail, it is not intended to restrict or in any way limit the scope of the appended claims to such de-tail. The various features shown and described herein may be used alone or in any combi-nation. Additional advantages and modifications will readily appear to those skilled in the art. The invention in its broader aspects is therefore not limited to the specific details, rep-resentative apparatus and method, and illustrative example shown and described. Accordingly, departures may be made from such details without departing from the spirit and scope of the general inventive concept.

LIST OF REFERENCE SIGNS

10 Drive system
11 Drive unit
12 Central shaft
13 Housing
14 Upper part of housing
15 Lower part of housing
16 central gear
17 decentralized gear
18 electric machine
19 Wave
20 Bearing
21 bushing
22 Clutch
23 Recording stand

What is claimed is:

1. A drive system, comprising:
at least one drive unit, each drive unit comprising:
   a central shaft,
   a central gear connected to the central shaft such that the central gear rotates at a speed of the central shaft,
   two or three or four decentralized gears distributed around a circumference of the central gear and meshing with the central gear, the decentralized gears having diameters greater than the diameter of the central gear such that the speed of the central gear is greater than the speed of the decentralized gears, and
   a plurality of electric machines operable at a speed of at least 4,000 rpm, wherein each decentralized gear is coupled directly and without transmission to a single electric machine or to two electric machines;
   wherein the electric machines of the respective drive unit are drive motors which drive the decentralized gears;
   whereby the drive system is adapted for providing a power output of at least one megawatt.

2. The drive system of claim 1, wherein the decentralized gears of the respective drive unit mesh with the central gear thereof in such a way that the rotational speed of the central gear is up to 4.0 times the rotational speed of the decentral-ized gears.

3. The drive system of claim 2, wherein the decentralized gears of the respective drive unit mesh with the central gear thereof in such a way that the rotational speed of the central gear is up to 3.0 times the rotational speed of the decentral-ized gears.

4. The drive system of claim 3, wherein the rotational speed of the central gear is up to 2.5 times the rotational speed of the decentralized gears.

5. The drive system of claim 1, wherein the decentralized gears of the respective drive unit are uniformly distributed around the circumference of the central gear.

6. The drive system of claim 1, wherein the decentralized gears of the respective drive unit are identical.

7. The drive system of claim 6, wherein the electric machines of the respective drive unit are identical.

8. The drive system of claim 1, wherein:
the at least one drive unit comprises several identical drive units connected in series; and
the central shafts of the respective drive units are coupled together.

9. The drive system of claim 1, wherein:
the central shaft of the respective drive unit is an output shaft configured to be coupled with a unit to be driven by the drive system.

10. The drive system of claim 9, wherein the central shaft of the respective drive unit is an output shaft configured to be coupled with a compressor or a centrifugal pump.

11. The drive system of claim 1, wherein:
the central shaft of the respective drive unit is a drive shaft configured to be coupled with a torque producing device.

12. The drive system of claim 11, wherein the central shaft of the respective drive unit is configured to be coupled with a turbine.

13. The drive system of claim 1, wherein the electric machines of the respective drive unit are electric machines with a frequency converter.

14. A method for operating a drive system that includes at least one drive unit, each drive unit comprising:
a central shaft,
a central gear connected to the central shaft such that the central gear rotates at a speed of the central shaft,
two or three or four decentralized gears distributed around a circumference of the central gear and meshing with the central gear, the decentralized gears having diam-eters greater than the diameter of the central gear such that the speed of the central gear is greater than the speed of the decentralized gears, and
a plurality of electric machines operable at a speed of at least 4,000 rpm, wherein the electric machines each include a frequency converter and each decentralized gear wheel is coupled directly and without transmission to a single electric machine or to two electric machines;
wherein the electric machines of the respective drive unit are drive motors which drive the decentralized gears;
whereby the drive system is adapted for providing a power output of at least one megawatt;
the method comprising:
   varying an output speed of the electric machines of the respective drive unit by adjusting the frequency of the respective frequency converters.

* * * * *